United States Patent Office 3,350,778
Patented Nov. 7, 1967

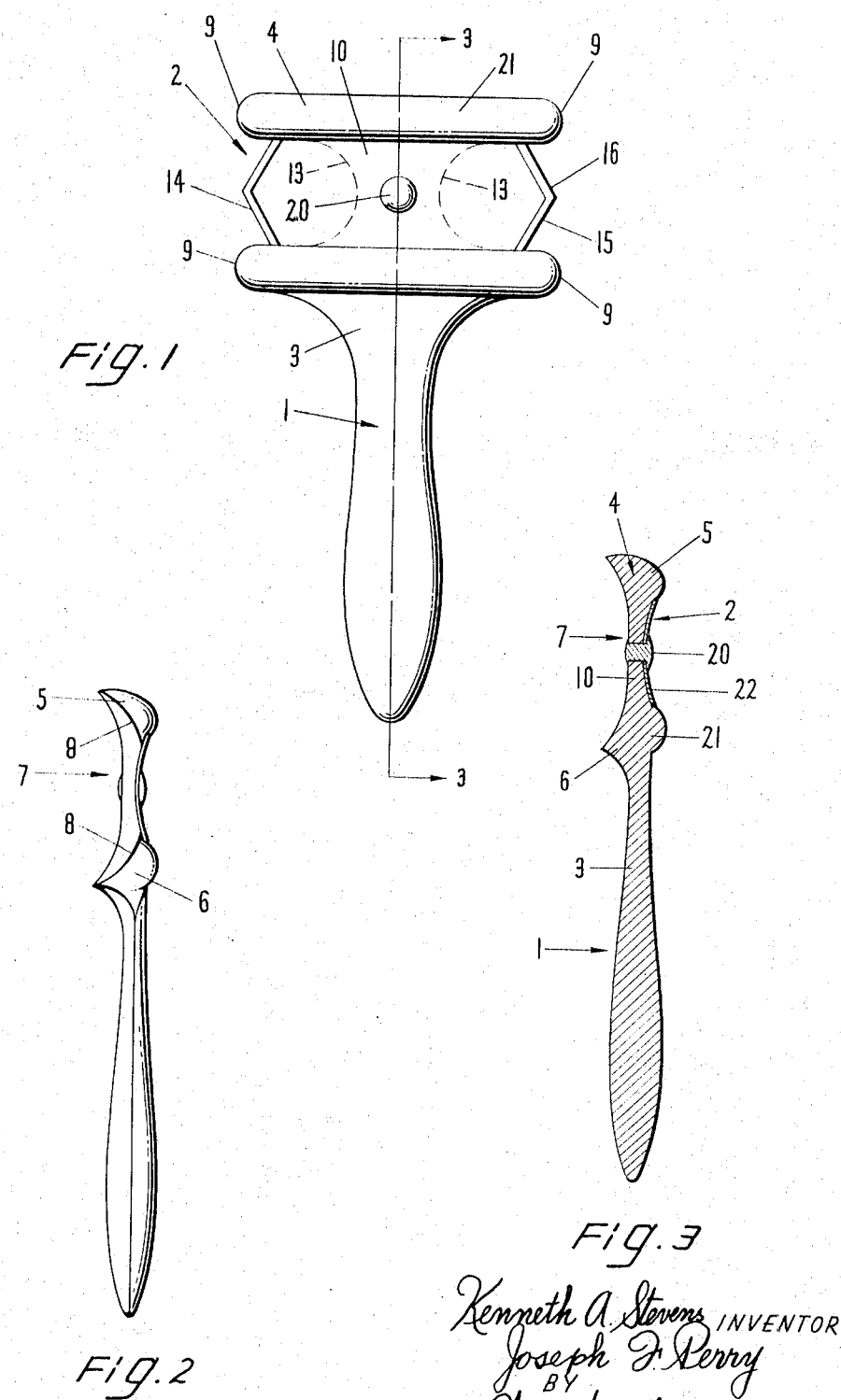

3,350,778
ONION PEELER
Joseph F. Perry, 114 York St., Stoughton, Mass. 02072, and Kenneth A. Stevens, 84 Dexter St., Milton, Mass. 02186
Filed May 4, 1966, Ser. No. 547,641
7 Claims. (Cl. 30—24)

ABSTRACT OF THE DISCLOSURE

A peeler primarily useful in peeling onions comprising a holder and a blade with the holder having a handle and a head integral with it. The head has parallel marginal edges defining a channel within which an arcuately cross-sectioned blade is secured with the blade having cutting edges extending beyond the ends of the channel.

---

The present invention relates to an improved peeler designed primarily to peel fruit and vegetables but, especially, onions.

Peeling onions is a difficult and odious job because of the inherent nature of the onion. The acrid vapors and the shell-like layers of onions make them difficult to peel quickly with minimum waste. The present invention is specifically designed to facilitate the peeling of onions in a rapid and efficient manner and with minimum waste. The present invention is also designed to be used for peeling other vegetables and fruits.

It is also an object of the present invention to provide an improved peeler which is inexpensive to manufacture, easy to maintain and clean, sturdy in construction, and safe and useful for either right-handed or left-handed people.

These and other objects and advantages of the present invention will be more clearly understood when considered in conjunction with the accompanying drawings in which:

FIG. 1 is a plan view of a peeler embodying the invention;

FIG. 2 is a side elevational view looking from one end of FIG. 1; and

FIG. 3 is a cross-sectional view taken along the line 3—3 of FIG. 1.

The peeler illustrated in the drawings comprises a holder 1 and a blade 2. The holder 1 is preferably an integrally formed member which may be made of plastic or metal. This holder includes a handle 3 and a head 4 integral with the handle. The head 4 is formed with a pair of spaced, depending marginal edges 5 and 6, which define a shallow channel 7 that extends transverse to the length of the handle 3. These marginal edges are preferably parallel with one another and have surfaces 8 that in part forms a concavity or a portion of this channel 7. These marginal edges 5 and 6 are interconnected by a span 10 which is centrally located with respect to the marginal edges and which extends in a direction substantially aligned with the length of the handle 3. The span 10 tapers in thickness from the thickest portion at its longitudinal center portion in a direction towards the blade edges 14 and 15. It also arcuately increases in width from its centermost portion towards the marginal edges 5 and 6 along its side edges 13.

The blade 2 is bowed along an axis normal to blade edges 14 and 15 to form a concave blade with the concavity opposed to the concavity of the channel 7 as best illustrated in FIG. 3. The blade or cutting edges 14 and 15 of the balde 2 are angularly formed between the marginal edges 5 and 6 thereby defining an engaging portion or tip 16 that extends to the ends of the channels, as defined by marginal edges 5 and 6. This engaging portion or tip 16 which lies preferably at the lowermost portion of the concavity defined by the blade is designed to be the first portion of the blade which cuts into the onion being peeled. The tip or engaging portion 16 is preferably substantially aligned with the extreme ends 9 of the marginal edges 5 and 6.

The blade 2 may be removably secured to the head by locking means which projects through an aperture in the blade into the center portion of the span 10. This locking means 20 may comprise any suitable means, as for example, a screw or a rivet. If a screw is used, its threaded shank should be threaded into a complementary portion of the span 10. Such a screw may be removable for separately cleaning the blade and the holder.

A longitudinal projection 21 is integrally formed, and is continuous with each marginal edge 5 and 6. This longitudinal projection extends beyond the side 22 of the blade that faces away from the channel 7. These longitudinal projections define an outwardly facing channel that is designed to guide peelings over the top of the blade.

The peeler may be used in a variety of ways; however, the most convenient way in which this peeler can be used to peel onions and the like is for the person using it to grasp the handle 3 with one hand. The other hand holds the onion or object being peeled. The blade is then scraped against the onion in an arcuate motion with the operator using his thumb of the hand holding the peeler against the object being peeled for a steadying motion. The peelings will then generally slide over the end of the blade guided by the arcuate surface of the span 10, away from the peeler's hand. The operator may, of course, hold the peeler with either hand since it is symmetrically arranged.

What is claimed is:

1. A peeler comprising a holder and blade,
said holder having a handle and head integral with one another, said head having spaced depending marginal edges defining a channel extending transverse to said handle, and said blade having a cutting edge with an engaging portion extending transverse to said channel and with its ends extending generally longitudinally of said handle,
and means securing said blade to said head with the blade spanning said channel and with said blade cutting edge extending to one end of said channel.

2. A peeler as set forth in claim 1 wherein said blade cutting edge has an angular configuration, with the apex of said angle lying intermediate said marginal edges and defining said engaging portion.

3. A peeler as set forth in claim 2 wherein said blade is bowed along an axis transverse to said handle forming a concave blade with the concavity of the blade opposed to the concavity of said channel.

4. A peeler as set forth in claim 3 wherein said head is formed with longitudinal projections continuous with said marginal edges and extending therefrom beyond the side of said blade facing away from said channel.

5. A peeler as set forth in claim 4 wherein said marginal edges are interconnected by a span and said span underlies said blade and tapers in thickness from its center portion in a direction toward said blade edge.

6. A peeler as set forth in claim 5 wherein said blade has a plurality of cutting edges with one at each end of said blade, said cutting edges being similar in construction, and with each extending to a different end of said channel.

7. A peeler as set forth in claim 6 wherein said means securing said blade to said head comprises means projecting through an aperture in said blade into said span.

References Cited
UNITED STATES PATENTS

| | | |
|---|---|---|
| 414,908 | 11/1889 | Hirschel. |
| 1,794,823 | 3/1931 | Beechlyn _____ 30—24 X |
| 1,898,747 | 2/1933 | Schacht _____ 30—169 |

OTHELL M. SIMPSON, *Primary Examiner.*

G. WEIDENFELD, *Assistant Examiner.*